W. H. McCORMICK.
Corn-Planters.
No. 146,929. Patented Jan. 27, 1874.
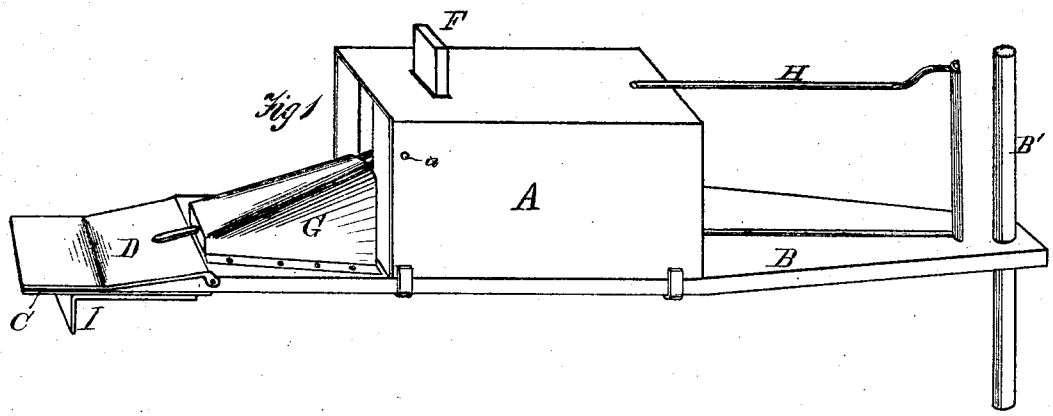
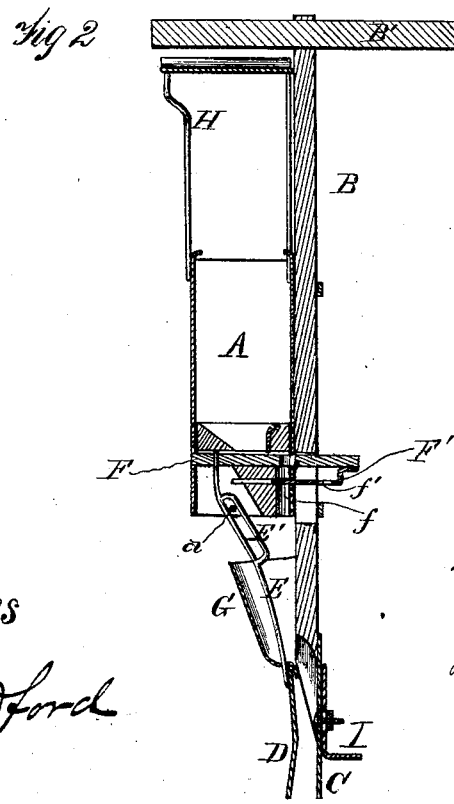

UNITED STATES PATENT OFFICE.

WILLIAM H. McCORMICK, OF MUNCIE, INDIANA, ASSIGNOR OF TWO-THIRDS HIS RIGHT TO ARTHUR P. PATTERSON AND CHARLES P. SAMPLE, OF SAME PLACE.

IMPROVEMENT IN CORN-PLANTERS.

Specification forming part of Letters Patent No. 146,929, dated January 27, 1874; application filed January 16, 1874.

*To all whom it may concern:*

Be it known that I, WILLIAM H. McCORMICK, residing at Muncie, in the county of Delaware and State of Indiana, have invented certain Improvements in Corn-Planters, of which the following is a specification:

This invention relates to hand corn-planters; and the improvement consists in the employment of a sliding seed-box, so connected to the seed-slides and the movable jaw of the dibble or boot, that by raising and lowering it the latter two will be properly operated for dropping and depositing the seed.

Figure 1 is a perspective view of my improved hand corn-planter. Fig. 2 is a vertical sectional elevation thereof.

The same letters of reference are used in both figures in the designation of identical parts.

The seed-box A is attached by means of metallic loops to the stock or dibble B, which is at the lower end provided with the usual blade C, forming one of the jaws for temporarily holding the seed previous to its deposition in the ground. The upper end of the stock terminates in a cross-handle, B'. The jaw D has at its upper end ears, by which it is pivoted to the edges of the stock B, and fixed to it is an upwardly-projecting rod, E, so bent that the slot E' therein shall have an inclination of, say, forty-five degrees, more or less. In this slot plays the pin $a$, fastened to the lower end of the seed-box, so that in moving the latter up and down on the stock, the jaw D will be successively opened and closed by the action of the pin $a$ upon the slotted rod E. The upper end of the rod E enters an aperture in the seed-slide F, and operates the same simultaneously with the jaw D. The seed-slide contains the ordinary seed-aperture for receiving, each time it is brought under the opening in the bottom of the box A, a regulated quantity of seed to be deposited in a hill. When drawn back it discharges this seed through an aperture in the false bottom; but, instead of dropping it directly through the jaws—which are open at that time—into the ground, as usual, it is intercepted by a plate, F', which is suspended from the seed-slide, and moves in a corresponding slot in the false bottom of the seed-box, controlling the aperture $f$ therein. Near its outer end this plate has a hole, $f'$, through which the seed can drop when it is brought in line with the hole $f$, which occurs at the time when the seed-slide is receiving another supply from the seed-box and the jaws C D are closed. The seed falls from the plate F' into the conductor G, and thence between the jaws, where it is retained until its deposition. The seed-box is provided with a yoke, H, extending up to near the handle of the stock B, its cross-bar being so disposed that it may readily be drawn up by the hand grasping the handle B'. The motions of the seed-box are limited at the bottom by the conductor G, and at the top by the handle B', it having sufficient play between the two for the proper operation of the seed-slide and the jaws D. The foot-piece I on the jaw C is made adjustable vertically for the purpose of regulating by it the depth at which the seed shall be deposited.

What I claim as my invention, and desire to secure by Letters Patent, is—

1. The combination of the sliding seed-box A $a$, stock B C, pivoted jaw D, and rod E E', substantially as and for the purpose specified.

2. The combination of the sliding seed-box A $a$, seed-slide F, and rod E E', pivoted to the stock, substantially as and for the purpose set forth.

3. The combination of the sliding seed-box A $a$, stock B C, movable jaw D, rod E E', and seed-slide F, substantially as and for the purpose specified.

In testimony whereof I have signed my name to this specification in the presence of two subscribing witnesses.

WILLIAM ×his H. McCORMICK.
mark.

Witnesses:
WILLIAM SHICK,
CALVIN HAINES.